Figure 1:
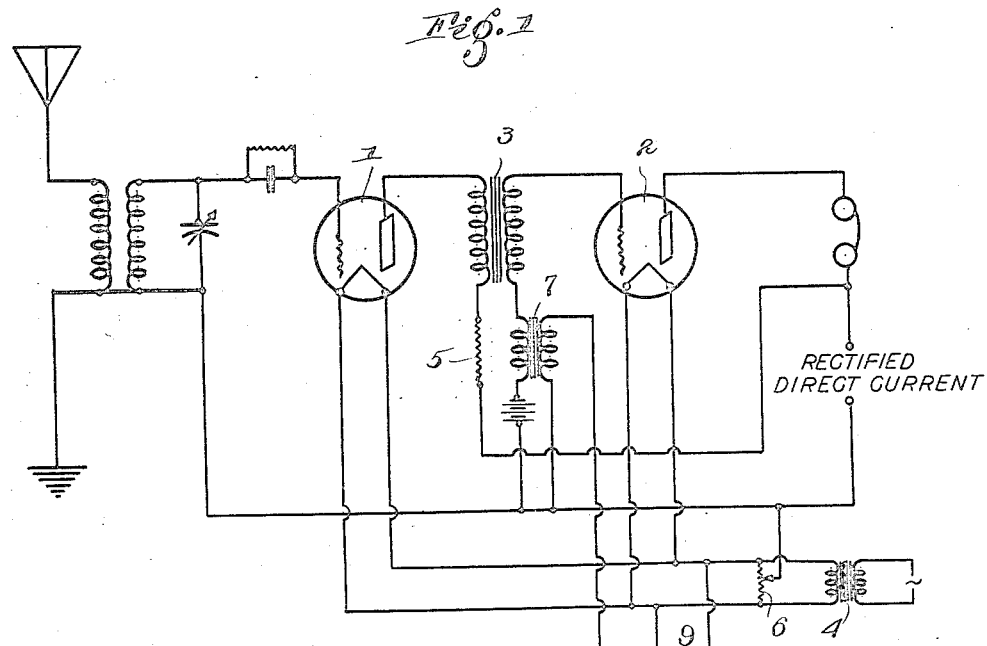

Patented Feb. 25, 1936

2,032,253

UNITED STATES PATENT OFFICE 2,032,253

AMPLIFYING SYSTEM

Vannevar Bush, Medford, Mass., assignor, by mesne assignments, to Raytheon Manufacturing Company, Newton, Mass., a corporation of Delaware Application July 8, 1927, Serial No. 204,280
Renewed June 13, 1931

15 Claims. (Cl. 179—171)

My invention relates to amplifying systems, more especially to an arrangement for energizing the filaments of cascaded thermionic devices with alternating current.

It has been proposed to apply periodically varying current directly to filamentary cathodes, a potentiometer being placed across each pair of terminals and connection made to the control electrode through the interstage transformer and to ground from the mid-tap of the potentiometer. The average potential difference between cathode and control electrode thus remains substantially constant throughout each pulsation of the supply energy, the ground lead also serving to reduce the hum. In case there are voltages induced in the system from an extraneous source, as for example, an incompletely smoothed rectified plate current or other disturbance, it is apparent that by controlling the position of the tap on the potentiometer, an electromotive force may be introduced in the grid circuit to oppose and effectively compensate for the induced voltage, provided the latter is in phase with the voltage of the filament winding on the transformer. However, voltages not in phase can not thus be eliminated and there is then always a residual hum.

I propose to impress on the control circuit of one or more tubes, an out-of-phase voltage, i. e. an electromotive force having a quadrature component, which when combined with the in-phase component derived from the potentiometer will neutralize completely the disturbing energy irrespective of phase relations.

In the drawing, I show a receiving system of conventional design comprising thermionic detector 1 transmitting audio frequency signal current to amplifier 2 through interstage coupling 3. The filament of each thermionic device is energized by alternating current of standard frequency and voltage through transformer 4. For plate voltage I prefer to employ rectified energy derived from an alternating current source, ordinarily the same as supplies the cathode, although it is apparent that the usual "B" batteries may also be used to advantage. A resistance 5 is preferably inserted in the output of the detector to reduce the plate voltage at this point. Potentiometer 6 is shunted across transformer 4, connection being made from an adjustable tap directly to ground and to grid of devices 1 and 2 through coupling transformers in the usual manner. It will be evident that by moving the tap off center, an alternating voltage substantially in phase with that in the secondary of the filament transformer 4, may be applied to each of the control members, causing amplified undulations in the plate circuit. These undulations may be employed to partially offset disturbing potentials induced in either input or output circuits from any cause whatsoever, e. g. B eliminator incompletely smoothed, electrode capacity effects or energy supply batteries partially run-down and offering sufficient internal resistance to cause regeneration.

However, the disturbing potentials are often entirely out of phase with the stabilizing voltage or contain components of substantial magnitude in quadrature therewith, precluding complete compensation. Accordingly, in the input circuit of one of the tubes (the amplifier in the drawing) I insert a transformer 7, energizing same from the alternating current supply through potentiometer 8, the terminals of which are connected to fixed condensers 9. The presence of network 8—9 assures an electro-motive force with a substantial component in quadrature with that of the filament supply and when operated in conjunction with the in-phase component furnished by the potentiometer 6, produces a net voltage in proper time phase to completely nullify foreign disturbances.

In the event the disturbing potentials have a substantial component of multiple or fractional frequency in addition to that of the primary supply, it is evident that a second network may be employed to introduce a compensatory harmonic. The multiple or fractional frequency energy may represent potentials induced electromagnetically and/or electrostatically by an extraneous source or derived from any of the apparatus within the system. Thus in Fig. 2, the plate circuit energization is obtained from a double or full-wave rectifier having an output characterized by voltage ripples, the greater part of which may comprise double or harmonic frequency undulations. Impulses to neutralize the in-phase components may be taken from the rectifier in reverse phase order while for quadrature, it is necessary to transmit the compensatory current through a network substantially reactive as in the previous case. As shown, the in-phase potential is derived from potentiometer 10 energized in any convenient manner, e. g. a circuit including stopping condenser 11 and transformer 12 designed to select the double frequency or other disturbing harmonic. Out-of-phase undulations are available at potentiometer 13 energized through reactances 14—14. It is apparent that by impressing the combined effect of both sets of impulses through transformer 15 on the input circuit of tube 2, one of the sources of troublesome noise is practically removed.

Figure 2:
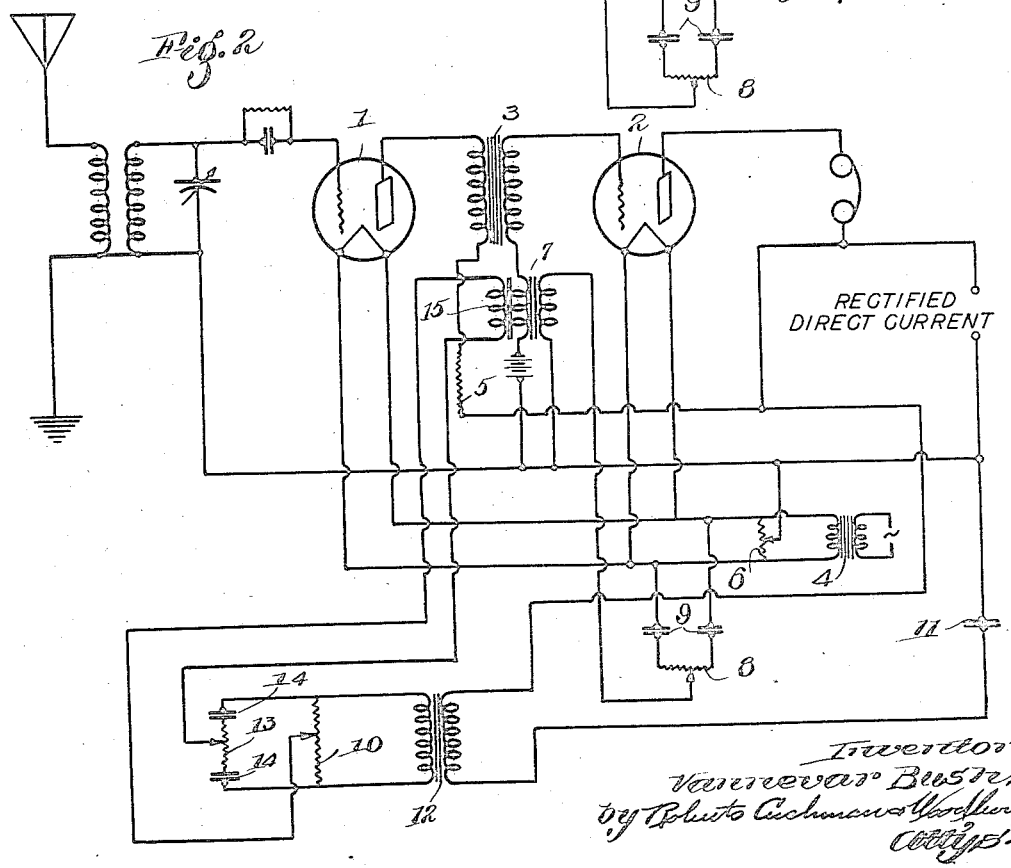

While in Fig. 1, I have exemplified my invention by showing a method of and apparatus for removing in-phase and out-of-phase components of frequency comparable to that of the primary source and in Fig. 2, an additional arrangement for disposing of the double or harmonic periodicity, it is apparent that appropriate circuits may be devised to produce any combination of compensatory components, e. g. an in-phase at primary supply frequency and quadrature at double or fractional frequency depending upon which of the frequencies and their components are predominant. Moreover, it is also evident that systems other than capacitative may be employed for producing the quadrature voltage, e. g. inductive means. The application of the stabilizing impulse is not limited to either a receiving circuit, an audio frequency amplifier or to the input thereof, but may be impressed across any convenient circuit throughout the amplifying train.

I claim:

1. An amplifying system comprising a plurality of electron discharge devices in cascade relation, each device containing a filamentary cathode, control electrode and anode, a source of alternating current for energizing said cathodes, a potentiometer across said source, connections between a tap on the potentiometer and each of ground, control electrodes and anodes, a network shunted across said source, said network comprising reactances and a connection between the reactances and one or more of the control electrodes.

2. In an amplifying system, a thermionic device having a cathode, control electrode and anode, said cathode being energized by alternating current, a potentiometer bridged across the source of said current, means for connecting a tap on said potentiometer with the control electrode of said thermionic device, a reactance network bridged across said current source, and means for impressing impulses from said network on the control electrode.

3. In an amplifying system, a thermionic device having a cathode, control electrode and anode, said cathode being energized by alternating current, and said anode circuit being energized by pulsating direct current, a potentiometer bridged across the cathode supply source, connections from a tap on said potentiometer to said control electrode, a reactance network bridged across said cathode source, means for impressing impulses from said reactance network on the control electrode, a transformer having its primary connected in the plate circuit, the secondary of said transformer being bridged by a potentiometer and reactance network in parallel to each other, and connections between a tap on said last named potentiometer and reactance for impressing impulses on said control electrode.

4. In an amplifying system, a thermionic device having a cathode, control electrode and anode, said cathode being energized by alternating current, an impedance bridged across the source of said current, means for selectively connecting a point in said impedance with said control electrode, and means for impressing on said electrode a voltage displaced substantially ninety degrees from the voltage of said source.

5. In an amplifying system, a thermionic device having a cathode, control electrode and anode, said cathode being energized by alternating current, means for impressing on said control electrode a voltage in phase with the voltage of said source, and separate means for impressing on said electrode a voltage displaced substantially ninety degrees from the voltage of said source, each of said means being adjustable to vary the value of the respective voltages.

6. In an amplifying system, a thermionic device having a cathode, control electrode and anode, said cathode being energized by alternating current, means for impressing a potential on said control electrode, which potential is of a constant value with respect to a point intermediate the ends of said cathode, means for superimposing on said potential an alternating voltage, and means for regulating the magnitude of said voltage and the phase angle between said voltage and the voltage of said source.

7. In an amplifying system, a thermionic device having a cathode, control electrode, and anode, said cathode being energized by alternating current and said anode being supplied with a direct current voltage having an alternating current component, said control electrode and anode being connected to said cathode, means for applying to said control electrode a definite alternating voltage at a definite phase angle with respect to the voltage of said cathode energizing source, means for regulating the phase and magnitude of said voltage applied to the control electrode, means for applying to said control electrode an additional definite alternating voltage at a definite angle with respect to the alternating component of the anode voltage, and means for regulating the phase and value of said additional voltage.

8. In combination, a thermionic device having a cathode, control electrode, and anode, means for energizing said device from a source of alternating current, means for impressing on said control electrode a signal voltage, separate means for impressing on said control electrode a voltage in phase with the voltage in said alternating current source, and additional independent means for impressing on said control electrode a voltage displaced by a substantial phase angle from the voltage of said source, whereby disturbing effects of said source may be substantially eliminated.

9. In combination, a thermionic device having a cathode, control electrode, and anode, means for energizing said device from a source of alternating current, means for impressing on said control electrode a voltage in phase with the voltage of the alternating current source, and separate means for impressing on said control electrode a voltage displaced by a substantial phase angle from the voltage of said source, each of said means being adjustable to vary the value and direction of the respective voltages with respect to the voltage of said source.

10. In combination, a thermionic device having a cathode, control electrode, and anode, said cathode being energized by alternating current, means for impressing on said control electrode a signal voltage, separate means for impressing a potential on said control electrode, which potential is of a constant value with respect to a point intermediate the ends of said cathode, and additional independent means for superimposing on said potential an alternating voltage displaced by a substantial phase angle from the voltage of said source, whereby disturbing effects of said source may be substantially eliminated.

11. In combination, a thermionic device having a cathode, control electrode, and anode, said cathode being energized by alternating current and said anode being supplied with a direct current voltage having an alternating current component, said control electrode and anode being connected to said cathode, means for impressing on said control electrode a signal voltage, separate means for applying to said control electrode a definite alternating voltage at a definite phase angle with respect to the voltage of said cathode-energizing source, and additional independent means for applying to said control electrode an additional definite alternating voltage at a definite angle with respect to the alternating component of said anode voltage.

12. In combination, a thermionic device having a cathode, control electrode, and anode, means for energizing said device from a source of alternating current, means for impressing on said control electrode a signal voltage, separate means for impressing on said control electrode a voltage in phase with the voltage of said alternating current source, additional means for impressing on said control electrode a voltage displaced by a substantial phase angle from the voltage of said source and having the same frequency as that of said source, and additional independent means for impressing a voltage on said control electrode having a frequency other than the frequency of said source, bearing a definite relationship to the frequency of said source, whereby disturbing effects of said source may be substantially eliminated.

13. In combination, a thermionic device having a cathode, control electrode, and anode, means for energizing said device from a source of alternating current, means for impressing on said control electrode a voltage in phase with the voltage of the alternating current source, and separate means for impressing on said control electrode a voltage displaced by a substantial phase angle from the voltage of said source, said last-named means being adjustable to vary the value and direction of its voltage with respect to the voltage of said source.

14. The method of balancing out hum of a given frequency from the output of an electro-acoustic system where the hum is produced by the alternating current component of imperfectly filtered fluctuating direct current which includes the steps of splitting the phase of the alternating current component causing the undesired hum, combining adjustable amounts of the two phase voltages of hum frequency derived from said split phase currents, applying the resultant voltage to the electro-acoustic system and adjusting the magnitudes of the component to phase voltages to completely neutralize the hum of the given frequency first mentioned.

15. In combination with a space discharge device circuit space current supply means comprising a source of uni-directional fluctuating current, means coupled to said source for deriving from the uni-directional fluctuating current at least two alternating currents of the same frequency but of differing phase, variable means for deriving from said two alternating currents a single current of predetermined phase and amplitude and means for impressing the last named derived single current upon the input electrodes of said space discharge device.

VANNEVAR BUSH.